United States Patent [19]
Herbenar

[11] 3,782,491
[45] Jan. 1, 1974

[54] POWER STEERING SYSTEM FOR ADJUSTABLE TRACK VEHICLES

[75] Inventor: Edward J. Herbenar, Detroit, Mich.

[73] Assignee: TRW Inc., Cleveland, Ohio

[22] Filed: Feb. 22, 1972

[21] Appl. No.: 227,770

[52] U.S. Cl...... 180/79.2 R, 180/DIG. 2, 280/34 R, 280/95 R
[51] Int. Cl. ......................... B62d 5/10, B62d 17/00
[58] Field of Search .................. 180/79.2 R, DIG. 2; 280/34 R, 95 R

[56] References Cited
UNITED STATES PATENTS

| | | | |
|---|---|---|---|
| 1,806,136 | 5/1931 | Weiss | 180/79.2 R X |
| 3,527,316 | 9/1970 | Jones et al. | 180/79.2 R |
| 2,732,233 | 1/1956 | MacMillan et al. | 280/95 R X |
| 1,775,176 | 9/1930 | Stokes | 180/79.2 R |
| 3,137,360 | 6/1964 | Biedess | 180/79.2 R X |
| 2,911,229 | 11/1959 | Strehlow | 280/34 R X |
| 3,229,992 | 1/1966 | Traywick | 280/95 R |
| 3,035,850 | 5/1962 | Dyer | 280/95 R |

Primary Examiner—Kenneth H. Betts
Assistant Examiner—Leslie J. Paperner
Attorney—Carlton Hill et al.

[57] ABSTRACT

A power steering system for adjustable track vehicles wherein a double-ended power cylinder moves a piston which carries a hollow power rod. The power rod in turn receives end portions of tie rod socket arms telescopically. The socket arms are attachable to the power rod at various points along the length of the socket arm to accommodate adjustability in the vehicle track. The socket arms terminate in movable stud joints which are connected to tie rod arms which in turn are connected to the wheel steering arm.

3 Claims, 3 Drawing Figures

PATENTED JAN 1 1974
3,782,491
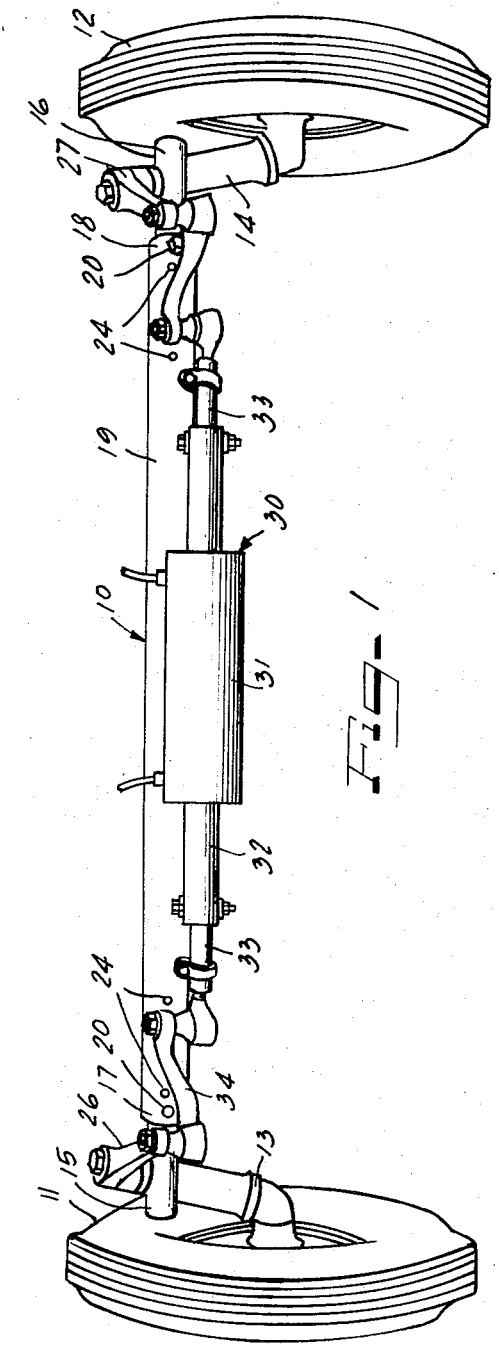
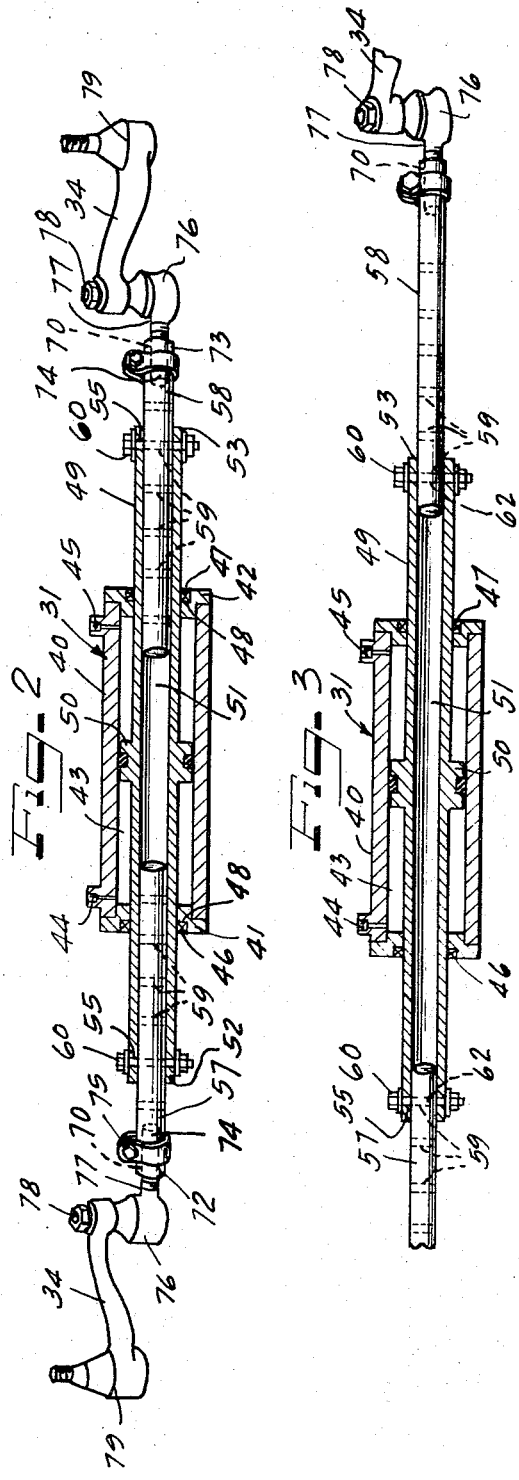

POWER STEERING SYSTEM FOR ADJUSTABLE TRACK VEHICLES

BACKGROUND OF THE INVENTION

1. Field of the Invention

This invention relates to steering linkages and more particularly to a power-assisted steering linkage for adjustable track vehicles.

2. Prior Art

Adjustable track vehicles, such as four-wheel farm tractors, have to be equipped with steering linkage assemblies connecting the dirigible wheels to the steering gear in a manner which can accommodate differences in the distance between the dirigible wheels.

Farm tractors, especially those of the four-wheel type, have axle adjustments which allow the two front wheels to be spaced apart at varying distances to allow the tractor to move through a planted field with the wheels only in the spaces between the planted rows. Since row spacing varies for numerous reasons, the tractors must be able to change the positioning of the wheels.

In order to provide for steerability of the front wheels, while at the same time accommodating adjustability of the wheels, it has been known to provide steering linkages having adjustable length factors. A common way of doing this has been to provide tie rods connected to a Pitman arm, the tie rods being of adjustable length.

The advent of power-assisted steering in connection with adjustable track vehicles has complicated the steering linkage adjustability problems. Because the tie rods must now be acted upon by a power member, they must either be attached to the power member in an adjustable manner or they must be designed to work with the power member while retaining their adjustability.

SUMMARY

My invention provides a novel combination of power member and steering linkage for use with adjustable track vehicles.

The invention utilizes a double-ended hydraulic power cylinder having a centrally disposed piston which is moved axially in the cylinder hydraulically. The piston is formed around and comprises part of a hollow power rod extending entirely through the cylinder and projecting beyond the ends thereof in movable relationship with the cylinder. That is to say that the power rod is movable axially in the cylinder under the influence of the movement of the piston.

Socket-ended steering rods have their opposite ends received in the interior of the power rod through the open ends thereof. The rods have a number of openings extending therethrough which are indexable with bolt openings adjacent the ends of the power rod. In this manner, the degree of projection of the socket-ended rods into the ends of the power rod is adjustable.

The sockets on the ends of the socket rods carry movable stud joints which are attached to one end of the tie rod arms, the other end of the tie rod arms being attached to the steering arm of the dirigible wheel. The use of the tie rod arms allows for non-similarity of movement between the socket arms and the steering arms.

The sockets on the end of the socket arms are preferably attached in an adjustable manner so as to provide for toe adjustment of the dirigible wheels, independent of the track adjustment.

It is therefore an object of this invention to provide a steering linkage for adjustable track vehicles.

It is an important object of this invention to provide a power-assisted steering assembly for adjustable track vehicles.

It is another and specific object of this invention to provide an adjustable-width power assisted steering assembly for use in connection with adjustable track vehicles.

It is yet another and more specific object of this invention to provide a power-assisted steering linkage assembly utilizing a double-ended hydraulic power cylinder which actuates a power rod having openings at either end thereof into which are telescopically received linkage members adjustably positionable to varying depths of penetration.

It is a most specific object of this invention to provide a power-assisted steering linkage assembly for adjustable track vehicles, the assembly including a double-ended hydraulic cylinder which moves a power rod transverse of the vehicle, the power rod having open ends with linkage members telescopically projecting into the open ends, the degree of projection being variable, the linkage members terminating in sockets which are attached to tie rod arms which in turn are attached to steering arms whereby the linkage members may move only transversely of the vehicle while the steering arms move arcuately.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and and scope of the novel concepts of the disclosure, and in which:

FIG. 1 is a perspective view of the dirigible wheels of an adjustable track vehicle equipped with the linkage assembly of this invention.

FIG. 2 is a partial cross-sectional view of the linkage assembly of FIG. 1.

FIG. 3 is a view similar to FIG. 2, illustrating extensibility of the linkage assembly.

DESCRIPTION OF THE PREFERRED EMBODIMENT

FIG. 1 illustrates the front axle 10 and dirigible wheels 11 and 12 of an adjustable track vehicle. The wheels 11 and 12 are attached to wheel mount members 13 and 14 which are received through openings in the ends of axle rods 15 and 16. The axle rods 15 and 16 extend into the ends 17 and 18 of an axle sleeve member 19. The axle sleeve member has bolts 20 projecting therethrough and through bores through the axle members 15 and 16 aligned with bolt openings 24. By removing the bolts 20 and moving the axle members 15 and 16 to a different position within the sleeve and then re-inserting the bolts into aligned openings, it is possible to adjust the distance between the dirigible wheels 11 and 12 to the desired degree.

In order to allow the wheels 11 and 12 to be steered, they are mounted to the axle ends 15 and 16 in a rotatable manner, whereby rotation of steering ams 26 and 27 will turn the wheels.

My invention provides a power-assisted steering linkage for moving the steering arms 26 and 27. The power-assisted steering linkage 30 includes a hydraulic power cylinder 31, a power-driven rod 32, socket-ended steering rods 33, and tie rod ends 34. In order to provide for the varying widths between the wheels 11 and 12, the linkage of my invention is adjustable as hereinafter described.

As best illustrated in FIG. 2, the power cylinder 31 includes a cylindrical housing 40 having axial ends closed by end caps 41 and 42, defining an interior 43 which is open to the exterior by pressure ports 44 and 45 opening through the cylinder housing 40 adjacent either end thereof and porting to the interior. The cylinder 31 is normally attached to the frame of the vehicle in non-movable relation. The pressure ports 44 and 45 are attached to a high-pressure source through a differentiating control operated in response to the steering wheel of the vehicle.

The end caps 41 and 42 have openings 46 and 47 therethrough protected by seals 48 surrounding a power rod 32,49 which extends entirely through the cylinder 40 projecting beyond the end caps 41 and 42. The power rod has positioned therearound, centrally thereof, a seal or piston 50. The piston 50 is illustrated as being received around the power rod 49, however, it is to be understood that it can be a separate element to which ends of two separate power rods are attached to form a single unit. The piston is positioned interiorly of the cylinder 40, and is shiftable axially therein in the manner of a hydraulic piston. The differentiating high-pressure control operates to port pressure through the opening 44 or the opening 45 in varying degrees so as to move the piston 50 axially of the cylinder to a desired position within the cylinder.

The power rod 49 is a hollow cylinder having a central opening 51 extending form one end 52 to the other end 53 of the power rod. Since the power rod is attached to the seal or piston 50, it moves therewith axially through the cylinder 40. Bolt holes 55 extend through the power rod adjacent the ends 52 and 53. Linkage members or rods 47 and 58 are telescopically received through the open ends 52–53 of the power rod. The linkage member rods 57–58 have a series of bores 59 extending therethrough, placed at varying spots along the length of the individual rods 57,58. Inasmuch as the rods 57–58 are telescopically received into the power rod 49, the bores 59 can be indexed with the bolt openings 55 and a bolt 60 projected therethrough. In this manner, the steering linkage is adjustable to any desired combined length. The bores 59 are preferably spaced from one another approximately the same distance as the corresponding bolt openings and bores of the axle 15,16 and axle sleeve 19 so that when the axle width is adjusted, the linkage can be adjusted to the same degree.

FIG. 3 illustrates the linkage as adjusted to its widest track. In this instance, the bolt 60 has been projected through the innermost 62 of the bores 59 on both the rods 57,58.

The rods 57,58 terminate, in the preferred embodiment, in ends which have openings 70 extending thereinto, the openings having female threads. The ends 72 and 73 are split as at 74, the split area being surrounded by a clamp 75. Ball joint sockets 76 have their male threaded stems 77 threaded into the female threaded openings 72,73.

The ball sockets 76 receive ball-ended studs 78 which project from the socket 76 and which in turn are attached to tie rod ends 34, the other ends of which terminate in ball joints 79 which are attached to the steering arms 26,27.

The termination of the rods 57,58 in ball joint sockets and the use of the tie rod ends 34 allows accommodation of the difference in movements between the power rod 32 and the steering arms 26,27. Thus, when the hydraulic cylinder 31 is actuated to move the piston 50, the power rod 32 moves axially of the cylinder. This movement is transferred to the rotary movement of the steering arms through the tie rod ends 34 which function in the manner of a drag linkage.

The attachment of the socket 76 by means of a threaded connection allows adjustment of the length of the linkage from either side independent of the adjustability built into the attachment between the rods 57,58 and the power rod. This allows the wheels to be adjusted for parallelism or "toe."

It can therefore be seen from the above that my invention provides a power-assisted steering linkage for use with adjustable track vehicles, the linkage having a power-moved member which telescopically receives socket-ended members, the extent of telescopic projection of the socket-ended members into the power-moved member being adjustable and the socket-ended members being attached through tie rod ends to the steering arm of the dirigible wheels of the vehicle. Ajustability of the wheels is easily accomplished in the normal manner with the additional step of removing bolts attaching the socket-ended rods to the power-driven rod to allow changes in the relative positioning of the two rods. Thereafter, after adjusting the track width of the vehicle, the bolts are reinsertable to lock the rods to prevent further movement during operation of the linkage.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A vehicle having an axle extending transversely thereof, axle rods at both ends of the axle in telescoped relation therewith, wheel mountings on the outer ends of the axle rods, wheels singably carried by said mountings, steering arms on said mountings for swinging said wheels, means for adjusting the telescoped lengths of the axle and axle rods to vary the track width of the wheels, a double ended hydraulic power cylinder fixed transversely on the vehicle adjacent said axle, a piston slidable in said cylinder, hollow piston shafts extending from the piston through and beyond the ends of the cylinder, steering rods slidably telescoped in the ends of the hollow piston shafts, tie rods at the ends of the steering rods, ball joints on the ends of the tie rods, the joints at the inboard ends of the tie rods connected to the steering rods in adjustable telescoped relation, the joints at the outboard ends of the tie rods connected to the steering arms, means locking the axle rods in selected telescoped relation with the axle to project the axle rods at selected distances beyond the axle, means locking the steering rods in selected telescoped relation with the piston shafts to project the steering rods at distances accommodating the selected distances of projection of the axle rods, and means for adjustably connecting the ball joints at the inboard ends of the tie rods in selected relation with the steering rods to adjust the toe of the wheels without altering the projection of said steering rods.

2. The vehicle of claim 1 wherein the ball joints at the inboard ends of the tie rods have sockets with laterally projected stems threaded in the ends of the steering rods and ball studs with shanks projecting from the sockets secured to the tie rods.

3. A power steering linkage for wheeled vehicles having adjustable track widths which comprises a double-ended hydraulic cylinder mounted transversely of the vehicle, a piston slidable in said cylinder having a power rod extending from both sides thereof through both ends of the cylinder, the outboard ends of said power rod being hollow, steering rods slideably telescoped in said hollow outboard ends of the power rod, means for locking the steering rods to the power rod in selected telescoped relation with the power rod to project the steering rods at selected distances beyond the power rod, tie rods at the ends of the steering rods, tie rod joints connecting the tie rods with the ends of the steering rods, and means for adjusting the joints to vary the position of the inboard ends of the tie rods from the outboard ends of the steering rods without altering the projection of the steering rods.

* * * * *